United States Patent [19]

Smoak

[11] 4,172,109

[45] Oct. 23, 1979

[54] PRESSURELESS SINTERING BERYLLIUM CONTAINING SILICON CARBIDE POWDER COMPOSITION

[75] Inventor: Richard H. Smoak, Lewiston, N.Y.

[73] Assignee: The Carborundum Company, Niagara Falls, N.Y.

[21] Appl. No.: 937,395

[22] Filed: Aug. 28, 1978

Related U.S. Application Data

[63] Continuation-in-part of Ser. No. 745,035, Nov. 26, 1976, abandoned.

[51] Int. Cl.$^2$ ............................................. C04B 35/56
[52] U.S. Cl. ......................................... 264/65; 106/44
[58] Field of Search ............................. 106/44; 264/65

[56] References Cited

U.S. PATENT DOCUMENTS

| | | | |
|---|---|---|---|
| 3,205,080 | 9/1965 | Ryshhewitch | 106/44 |
| 3,993,602 | 11/1976 | Prochazka | 106/44 |
| 4,023,975 | 5/1977 | Prochazka | 106/44 |
| 4,080,415 | 3/1978 | Coppola et al. | 264/65 |

Primary Examiner—Delbert E. Gantz
Assistant Examiner—Mark Bell
Attorney, Agent, or Firm—David E. Dougherty; Raymond W. Green; Donald C. Studley

[57] ABSTRACT

A sinterable silicon carbide mixture is described which is prepared by mixing finely-divided silicon carbide containing between about 0.5 and about 5.0 percent by weight of excess carbon with a finely-divided beryllium-containing additive wherein the amount of beryllium in the mixture is equal to between about 0.03 and about 1.5 percent by weight of the powder. A dense silicon carbide ceramic product is prepared from the powder mixture by pressureless sintering wherein the article is initially shaped and subsequently sintered in a beryllium-containing atmosphere at a temperature from about 1950° to about 2300° C.

7 Claims, No Drawings

PRESSURELESS SINTERING BERYLLIUM CONTAINING SILICON CARBIDE POWDER COMPOSITION

BACKGROUND OF THE INVENTION

This application is a continuation-in-part of U.S. Ser. No. 745,035 filed Nov. 26, 1976, now abandoned.

Silicon carbide, a crystalline compound of silicon and non-metallic carbon, has long been known for its hardness, its strength, and its excellent resistance to oxidation and corrosion. Silicon carbide has a low coefficient of expansion, good heat transfer properties, and maintains high strength at elevated temperatures. In recent years, the art of producing high density silicon carbide bodies from silicon carbide powders has been developed. Methods include reaction bonding, chemical vapor deposition, hot pressing, and pressureless sintering (initially forming the article and subsequently sintering). Examples of these methods are described in U.S. Pat. Nos. 3,853,566; 3,852,099, 3,954,483; and 3,960,577. The high density silicon carbide bodies so produced are excellent engineering materials and find utility in the fabrication of components for turbines, heat exchange units, pumps, and other equipment or tools that are exposed to severe wear and/or operation under high temperature conditions. The present invention relates both to silicon carbide powder mixtures that are adapted to use in the various methods of producing a high-density silicon carbide body by hot pressing or sintering and to the ceramic articles produced therefrom.

In order to obtain high density and high strength silicon carbide ceramic materials, various additives have been utilized. For example, a method of hot pressing silicon carbide to densities in order of 98 percent of theoretical by addition of aluminum and iron as densification aids is disclosed by Alliegro, et al., J. Ceram. Soc., Vol. 39, No. 11, Nov., 1965, pages 386 to 389. They found that a dense silicon carbide could be produced from a powder mixture containing 1 percent by weight of aluminum. Their product had a modulus of rupture of 54,000 psi at room temperature and 70,000 psi at 137° C. More recent advance is the use of boron as a densification additive, usually in the range of between about 0.3 and 3.0 percent by weight of the powder. The boron additive may be in the form of elemental boron or in the form of boron-containing compounds, for example, boron carbide. Examples of silicon carbide powders containing boron may be found in U.S. Pat. Nos. 3,852,099; 3,954,483; and 3,968,194.

SUMMARY OF THE INVENTION

It has now been found that high densification may be obtained when the sintering of silicon carbide-containing powders which include beryllium as a densification aid is carried out in the presence of a beryllium-containing atmosphere. By performing the sintering operation in an atmosphere containing beryllium, the amount of beryllium which would be normally removed from the powder compact is reduced, and the sintered ceramic product has a more consistent composition and is less porous than sintered products produced when beryllium is simply used as an additive in the powder. Beryllium may be added to the furnace atmosphere by inclusion into the sintering chamber of compounds of beryllium which produce a significant vapor pressure in the sintering temperature range. Such compounds may suitably be introduced into the sintering chamber by forming a solution or slurry of the beryllium compound and applying the solution or slurry to the interior of the chamber. Suitably, acetone is used as the carrier, but other carriers, such as water or other available liquids, may be employed, their only purpose being to enable good distribution of the beryllium material on the walls of the sintering chamber. A beryllium atmosphere may suitably be provided by a cover mix, a powder composition containing a beryllium source, for example, a mixture of silicon carbide and beryllium carbide. When using a cover mix, the article to be sintered is placed within the cover mix and the article in the mix exposed to sintering conditions. Alternatively, beryllium may be added to the furnace atmosphere by the use in the sintering chamber of a beryllium compound, per se, or by the use of furnace components, containers, crucibles and the like which contain a significant amount of beryllium. Crucibles utilized repeatedly in the production of sintered silicon carbide articles by the present process may build up a concentration of beryllium. The beryllium content of such crucibles may be monitored by standard analytical techniques, e.g., emission spectroscopy, to determine the amount of beryllium in the crucible and if additional beryllium is required to produce the beryllium atmosphere of the present invention.

DETAILED DESCRIPTION OF THE INVENTION

The starting silicon carbide powder, containing from about 0.5 to about 5.0 percent by weight excess carbon, is admixed with finely-divided beryllium or a beryllium-containing compound. Preferably, the particle size of both components is less than 5 microns and, more preferably, less than 2 microns. Exceptionally good distribution is obtained when the components are less than 1.0 microns. In order to obtain densification, the beryllium or beryllium-containing additive should be utilized in an amount whereby between about 0.03 and about 1.5 percent by weight of the powder is beryllium. The use of less than about 0.03 percent by weight has not been found to substantially increase the density of the sintered product. The addition of more than about 1.5 percent by weight of beryllium may be detrimental to densification.

A bulk density of at least 75 percent of theoretical is required for most applications, and bulk densities of at least 85 percent of theoretical are more often required. Sintered products having densities of 85 percent of theoretical may be obtained by the process of the present invention.

The beryllium additive of the present invention may be utilized alone or may be mixed with other densification aids, the most usual being boron in the form of elemental boron or boron-containing compounds. Boron in amounts between about 0.10 and about 1.5 percent by weight are useful; however, densities of over 90 percent of theoretical are obtainable when the boron additive is included in amounts of from about 0.1 to about 0.3 percent by weight. In general, such mixtures, when ready for sintering, contain from about 0.03 to about 1.5 percent by weight of beryllium and a total of between about 0.03 and about 3.0 percent by weight of densification aids.

The silicon carbide source material is preferably a submicron powder having a surface area greater than 8.0 m²/gm and containing from about 0.5 to about 5.0 percent by weight of excess carbon. Generally, powder compositions having surface areas between about 5 and about 20 m²/gm are found eminently useful. The excess carbon may be introduced, for example, during the production process, by the subsequent addition of carbon or a carbonaceous material, or as a binder prior to sintering.

The beryllium or beryllium-containing additive starting materials found useful are generally less than 50 microns in particle size and, preferably, less than 10 microns in particle size. A particle size of less than 5 microns is eminently useful for ease of even distribution of the beryllium or beryllium-containing additive with the silicon carbide powder to obtain a homogeneous mixture useful in sintering. Other additives may be utilized but are not necessary for the promotion of densification during the sintering process.

Preferably, the sintering operation is carried out in a inert atmosphere; gases, such as argon or helium, being inert to silicon carbide at the sintering temperature range are aptly suited to use. A reducing atmosphere may also be utilized.

The present invention utilizes a beryllium-containing atmosphere during the sintering operation. The use of beryllium in the sintering atmosphere yields marked improvement when the partial pressure of beryllium in the atmosphere during sintering is equal to or greater than the equilibrium vapor pressure of the beryllium contained in the silicon carbide powder compact. When the partial pressure of beryllium in the sintering atmosphere is the same or greater than that of beryllium in the article to be sintered, there will be no loss of volatile beryllium during the sintering operation. The now residual beryllium in the article acts as an aid in densification. At sintering temperatures, the partial pressure of beryllium in the atmosphere is usually at least $10^{-4}$ atmosphere and, more preferably, at least $10^{-3}$ atmosphere.

The silicon carbide powders containing beryllium or beryllium-containing compounds as densification aids generally contain beryllium in amounts between about 0.03 and about 1.5 percent by weight and, more preferably, from about 0.04 to about 1.25 percent by weight. The final sintered material usually contains about the same percentage of beryllium. It has been found that sintering in a beryllium-containing atmosphere does not appear to substantially change the amount of beryllium in the final product. The beryllium atmosphere functions to inhibit the escape of beryllium from the powder compact during the sintering operation without adding any significant amount of beryllium to the product.

Thus, in pressureless sintering, a silicon carbide powder, containing from about 0.5 to about 5.0 percent by weight of excess carbon, is mixed to form a homogeneous mixture with beryllium or a beryllium-containing additive so that a total of between about 0.03 and about 1.5 percent by weight of beryllium is present. The homogeneous mixture is then shaped into a green product. suitable additives to increase flow and binding of the particles may be incorporated into the starting mixture. The green product is subsequently sintered in an inert or in a reducing atmosphere in which the partial pressure of beryllium in equal to or greater than the equilibrium vapor pressure of the beryllium contained in the silicon carbide powder compact at a temperature of between about 1950° and about 2300° C. for a time sufficient to obtain a silicon carbide product having a density greater than 75 percent of theoretical. More particularly, a silicon carbide powder having a surface area of approximately 11 m²/gm and containing about 2.0 percent by weight excess carbon may be admixed with between about 0.04 and about 1.25 percent by weight of beryllium, suitably added as $Be_2C$, or in elemental form. The resultant mixture is then pressed to a density of about 1.76 gm/cm³. Binders may be used to increase the flowability of the powder or to increase the green strength of the pressed product. The pressed compacted powder is then sintered, preferably in an inert atmosphere, in which the partial pressure of beryllium during sintering is about $10^{-4}$ atmospheres or greater. The sintering operation is generally carried out at a temperature of about 2100° C. for a period of about 30 minutes. After cooling, the sintered product typically has a density of greater than 85 percent of theoretical.

The invention will now be illustrated by more specific examples which further illustrate various aspects of the invention but are not intended to limit it. Where not otherwise specified in this specification and claims, temperatures are given in degrees Celsius, and all parts and percentages are by weight.

EXAMPLE 1

Control

A silicon carbide powder having the following specifications was utilized as a starting material. The silicon carbide powder had a surface area greater than 8.0 m²/gm and the following analysis in percent by weight:

| | |
|---|---|
| Oxygen | less than 0.8 |
| Iron | less than 0.2 |
| Aluminum | less than 0.4 |
| Nickel | less than 0.1 |
| Titanium | less than 0.1 |
| Tungsten | less than 0.5 |
| Free Silicon | less than 0.4 |
| Silicon Carbide | greater than 97.5 |

A composition comprised of 95% of the silicon carbide powder characterized above was mixed in acetone with 5% of a phenolic resin known as Resin No. 8121, a product of Varcum Chemical Company. The slurry was comprised of about one part by weight mixture to about one part by weight acetone. The slurry was mixed for about 30 minutes and the acetone then allowed to evaporate. The resulting powder mixture was pressed into ½ inch diameter pellets weighing about 1½ grams each. The pellets or powder compacts typically had a density of about 1.76 gm/cm³.

Pellets prepared by the above procedure were placed in a graphite crucible, the crucible covered and pushed through a graphite resistance heating element tube furnace having a hot zone temperature of 2080° C. using an argon atmosphere. The bulk density of the pellets after passing through the tube furnace was 1.83 gm/cm³, about 57% of theoretical.

EXAMPLES 2 and 3

Beryllium Addition

Six mixes having the powder composition of Example 1 were prepared, except that varying amounts of beryllium in the form of beryllium carbide, having a particle size of less than 10 microns, were added to each mix. The composition of the mixes is shown in Table I.

Four pellets ½ inch in diameter and weighing about 1½ grams each were pressed from each mix, using the technique of Example 1. These pellets were divided into two sets, A and B, with two pellets per mix in each set.

The pellets from Set A were fired in a graphite resistance heating element tube furnace in accord with the procedure utilized in Example 1. Pellets from Set B were fired in a manner similar to Set A, with the exception that a cover mix was used to surround the pellets in the crucible. The cover mix was in the form of a powder having the composition 97.5% silicon carbide, 2.0% carbon and 0.5% beryllium in the form of beryllium carbide. The purpose of the cover mix was to increase the amount of beryllium in the atmosphere around the pellets.

The bulk density of the pellets was determined both before and after sintering and is shown in Table I. Thus, the pellets in Set A, fired in crucibles having no beryllium-containing atmosphere, ranged in fired density from 68.5 to 75.4% of theoretical. The pellets in Set B, fired in crucibles having a beryllium-containing atmosphere, ranged in fired density from 68.8 to 93.5% of theoretical.

TABLE I

| | Starting Material | | | SET A | | | | SET B | | | |
|---|---|---|---|---|---|---|---|---|---|---|---|
| | | | | Cured Density | | Fired Bulk Density | | Cured Density | | Fired Bulk Density | |
| Mix # | % SiC | % C | % Be | gm/cm$^3$ | % theoretical | gm/cm$^3$ | % theoretical | gm/cm$^3$ | % theoretical | gm/cm$^3$ | % theoretical |
| 1 | 97.95 | 2.0 | 0.05 | 1.76 | 54.8 | 2.27 | 71.0 | 1.74 | 54.2 | 3.00 | 93.5 |
| 2 | 97.90 | 2.0 | 0.10 | 1.78 | 55.5 | 2.25 | 70.1 | 1.78 | 55.5 | 2.96 | 92.2 |
| 3 | 97.80 | 2.0 | 0.20 | 1.77 | 55.1 | 2.38 | 74.1 | 1.76 | 54.8 | 2.95 | 91.9 |
| 4 | 97.60 | 2.0 | 0.40 | 1.74 | 54.2 | 2.42 | 75.4 | 1.73 | 53.9 | 2.80 | 87.2 |
| 5 | 97.20 | 2.0 | 0.80 | 1.75 | 54.5 | 2.42 | 75.4 | 1.75 | 54.5 | 2.68 | 83.5 |
| 6 | 96.40 | 2.0 | 1.60 | 1.74 | 54.2 | 2.20 | 68.5 | 1.67 | 52.0 | 2.21 | 68.8 |

EXAMPLE 4
Additive Mixtures

A silicon carbide powder having a composition similar to that in Example 1 was prepared and divided into batches. Various amounts of finelydivided boron carbide and beryllium carbide were separately added to each batch to obtain the powder compositions recited in Table II. The various batches were then mixed with a carbon source and pressed into pellets as in Example 1.

Two pellets from each batch were placed into a crucible of the same composition, covered with a crucible lid and placed within a graphite boat 4 inches in diameter and 19 inches in length. The pellets were sintered by pushing the boat containing the pellets through a graphite resistance element tube furnace operated under an argon atmosphere. The pellets had a residence time at 2150° C. of 30 minutes. The results are shown in Table II. Thus, following this procedure, in Mix #8, a silicon carbide starting material containing 0.10% boron, 0.10% beryllium, 2.0% carbon and 97.80% silicon carbide was pelleted to a cured density of 1.72 gm/cm$^3$, or 53.6% of theoretical. After firing, the density was found to be 2.98 gm/cm$^3$, or 92.8% of the theoretical density of silicon carbide.

A control sample containing only 0.5% boron and no beryllium was prepared as above described. The control sample was sintered in a manner similar to that described above, except that beryllium and boron were absent from the sintering atmosphere. After firing, the control sample was found to have a bulk density of 79.0% of theoretical.

TABLE II

| | | | | | Cured Density | | Fired Density | |
|---|---|---|---|---|---|---|---|---|
| Mix # | % B | % Be | % C | % SiC | gm/cm$^3$ | % theoretical | gm/cm$^3$ | % theoretical |
| 7 | 0.10 | 0.03 | 2.0 | 97.87 | 1.72 | 53.6 | 2.69 | 83.8 |
| 8 | 0.10 | 0.10 | 2.0 | 97.80 | 1.71 | 53.3 | 2.98 | 92.8 |
| 9 | 0.10 | 0.33 | 2.0 | 97.57 | 1.70 | 53.0 | 3.02 | 94.1 |
| 10 | 0.20 | 0.03 | 2.0 | 97.87 | 1.72 | 53.6 | 3.15 | 98.1 |
| 11 | 0.20 | 0.10 | 2.0 | 97.80 | 1.74 | 54.2 | 3.13 | 97.5 |
| 12 | 0.20 | 0.33 | 2.0 | 97.57 | 1.73 | 53.9 | 3.08 | 96.0 |
| 13 | 0.20 | 1.00 | 2.0 | 96.80 | 1.66 | 51.7 | 2.98 | 92.8 |

The foregoing description and embodiments are intended to illustrate the invention without limiting it thereby. Various modifications can be made in the invention without departing from the spirit or scope thereof.

What is claimed is:

1. A method of pressureless sintering silicon carbide powders containing beryllium or a beryllium-containing compound as a densification aid to produce a silicon carbide ceramic material having a density of at least 85 percent of theoretical which comprises the steps of:
   (a) shaping said powders into a green product, and
   (b) sintering said green product in an atmosphere containing beryllium, wherein the partial pressure of beryllium in the atmosphere during sintering is equal to or greater than the equilibrium vapor pressure of beryllium in said product.

2. The method of claim 1 wherein the partial pressure of beryllium is at least $10^{-4}$ atmosphere.

3. The method of claim 1 wherein the silicon carbide containing powders include beryllium in an amount between about 0.03 and about 1.5 percent by weight.

4. The method of claim 1 wherein the sintering atmosphere includes an inert gas.

5. The method of claim 1 wherein the beryllium in the atmosphere is introduced as beryllium carbide.

6. The method of claim 1 wherein the silicon carbide powder also contains boron or a boron-containing compound as a densification aid in an amount of up to about 1.5 percent by weight of boron.

7. The method of claim 6 wherein boron is included in an amount between about 0.1 and about 0.3 percent by weight.

* * * * *